April 29, 1924.
A. KJÖLSTAD
1,492,036
DISTRIBUTING MACHINE FOR ARTIFICIAL MANURES
Filed July 1, 1922
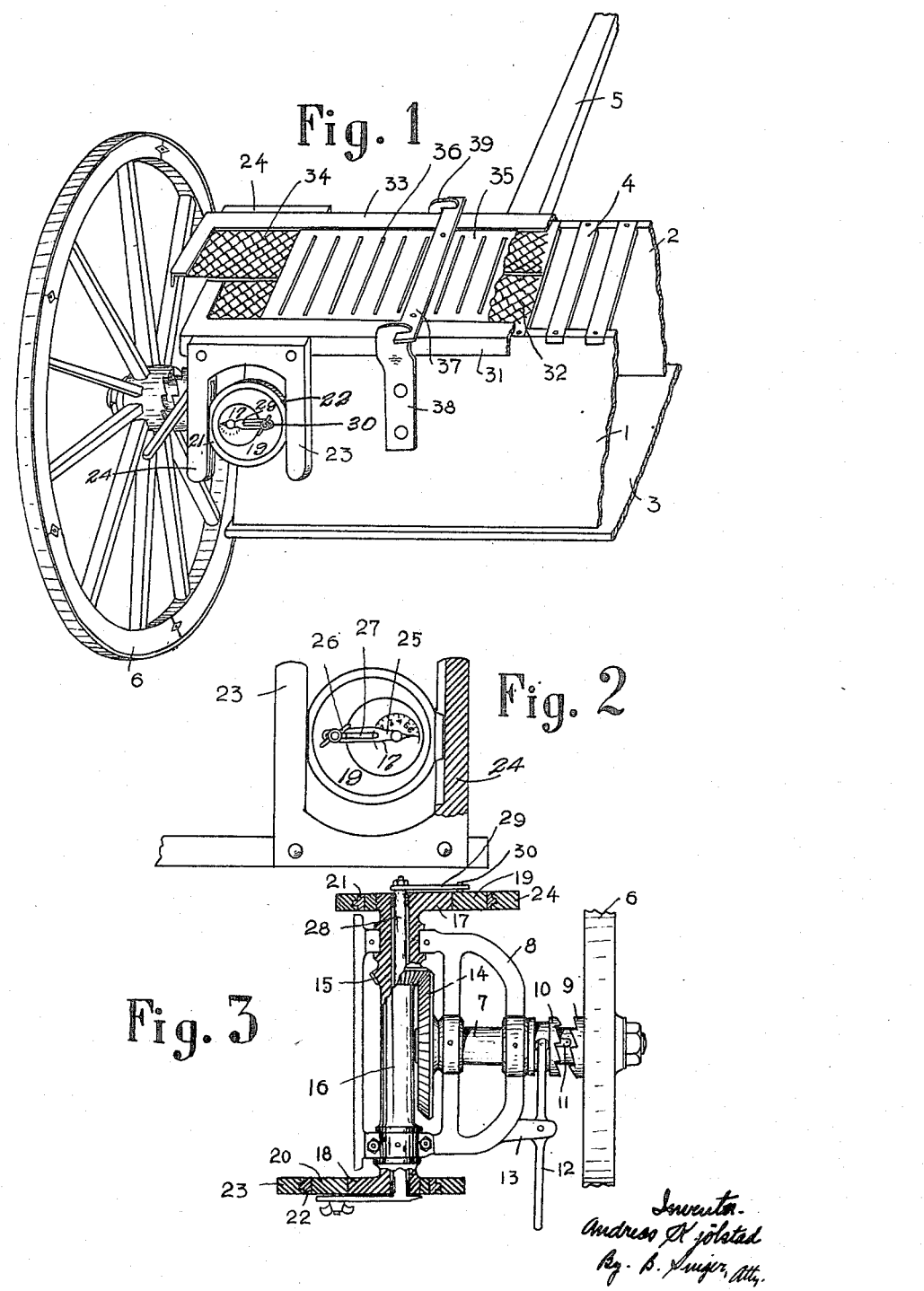

Patented Apr. 29, 1924.

1,492,036

UNITED STATES PATENT OFFICE.

ANDREAS KJÖLSTAD, OF CHRISTIANIA, NORWAY, ASSIGNOR TO A/S KJÖLSTADS GJÖDSELSPREDER, KARL JOHANSGT, OF CHRISTIANIA, NORWAY.

DISTRIBUTING MACHINE FOR ARTIFICIAL MANURES.

Application filed July 1, 1922. Serial No. 572,298.

*To all whom it may concern:*

Be it known that I, ANDREAS KJÖLSTAD, a subject of the King of Norway, residing at Bygdo Kongsgaard, Christiania, Norway, have invented new and useful Improvements in Distributing Machines for Artificial Manures, of which the following is a specification.

The usual distributors for artificial manures labour under the disadvantage that the manure is subject to a kneading before being delivered from the manure box. This kneading especially with certain manurial compositions will produce a pasty consistency of the manure and as a result the latter is only with difficulty or highy irregularly delivered from the manure box.

Another disadvantage adhering to the hitherto known distributing machines for artificial manures is their difficulty of being cleaned and slowness of dismantling.

The object of the present invention is to avoid these draw-backs and bring forth a distributing machine which is adapted for distributing of all the artificial manure composition for which there can be a requirement in agriculture.

The invention is illustrated in the accompanying drawing where:

Fig. 1 shows a front view and partially a sectional view of the driving device for the delivering mechanism.

Fig. 2 is a detail elevation of the adjusting mechanism, Fig. 3 is a detail elevation, partly in section, of the wheel actuated mechanism.

In the drawing 1 and 2 designates the side walls of the manure box and 3 the lid. The bottom of the box consists of laths 4. The pulling shaft 5 is fixed in the usual way directly to the side-wall 2.

The manure box is carried by wheels 6 which conveniently are rotatably mounted on axles 7 which may have bearing in frames 8 which are connected to the end walls of the box.

On the opposite side the wheel is provided with a clutch coupling 9, 10 the movable part 10 of which is shiftably but not rotatably connected to the axle by means of a wedge 11.

For working of the clutch coupling is provided a forked arm 12, which has bearing in a bracket 13 on the frame 8.

To the axle 7 is fixed a conical toothed wheel 14 which engages another conical toothed wheel 15, mounted on a hollow shaft 16 having bearing in the frame 8.

This hollow shaft at the ends carries eccentric disks 17, 18 which latter have eccentric bearing in disks 19, 20, which are encompassed by frame parts 21, 22. These frame parts are guided in forked parts 23, 24, which are rigidly connected to the feeding members.

The double eccentric described serves for regulating of the length of path of the delivering members and as a consequence of the quantity delivered. The adjusting arrangement may conveniently consist of an index finger 25, which by means of a wing screw 26 which engages a slot 27 in the finger may be fastened to the eccentric disk 20.

The finger is mounted on a shaft 28 which is passed through the hollow shaft 16 and at the opposite end carries an arm 29, which latter by means of a slot (Fig. 1) engages a pin 30 on the eccentric disk 19. The finger 25 is moved along a scale on the disk 18 and thereby indicates the quantity to be delivered which correspond to the adjustment of the two sets of eccentric disks relatively to each other, the relative position of the latter being regulative for the side motion of the forks 23 and 24 for each revolution of the shaft 16 as will be easily understood.

The fork 23 is fixed to a movable frame 31, the inside of which may conveniently consist of a coarse-mesh wire netting 32. The fork 24 is in a similar way fixed to a frame 33 which similarly is filled out with wire-netting 34. Between the frames 31 and 33 on the under side of the netting is provided an unmovable bottom 35, with cross slots 36. This bottom is kept in place by cross laths 37 which are removably fixed to fittings 38 and 39 on the sides of the manure box. The cross laths 37 also serve as guides for the frames 31 and 33.

The slots 36 are arranged in such a way that they are covered by the laths 4, so that normally no artificial manure can fall through. Delivering will take place after the clutch 9, 10 is let in through the alternate forward and backward motion of the frames 31, 33, the wire netting 32, 34 thereby alternately forwarding the manure to the delivery slots. The longer the path of the netting is, the more artificial manure will be conveyed to the delivery slots and the more manure will be spread per unit area.

For cleaning of the distributing machine the pulling shaft is tilted over so that the machine will come into the position shown in Fig. 1. In this position the bottom 35 may be removed, the cross laths 37 being pushed out from notches in the fittings 38, 39, a forelock (not shown) being first removed.

The frames 31 and 33 may then be removed so that the laths 4 are accessible from the under side and may be cleaned by means of a brush.

Instead of the forked parts 23, 24 there is no objection to using a crank-gear arrangement, for the driving of the frame parts 31, 33.

Likewise the adjusting device for the double eccentric may be designed in other ways than the one shown without departing from scope of the invention.

Neither is the invention limited to the employment of wire netting for conveying of the artificial manure nor otherwise to any definite embodiment of the various details of construction.

Claims:—

1. In a distributing machine for artificial manure, a manure box having a slotted bottom, delivering members comprising screenlike devices situated below said bottom and movable alternately in opposite directions, and a second slotted bottom situated below said delivering members.

2. In a distributing machine for artificial manure, a manure box having a slotted bottom, delivering members comprising screenlike devices situated below said bottom and movable alternately in opposite directions, and a second bottom situated below the delivering members, and provided with slots arranged in staggered relation to the slots of the upper bottom.

3. In a distributing machine for artificial manure, a manure box having a slotted bottom, delivering members comprising a plurality of screenlike devices situated side by side below said bottom and movable alternately in opposite directions, a second slotted bottom situated below said delivering members, and a driving device imparting to the delivering members movements with a difference of phase of substantially 90° according to the number of members.

4. In a distributing machine for artificial manure, a manure box having a slotted bottom, delivering members comprising a plurality of screenlike devices situated side by side below said bottom and movable alternately in opposite directions, a second slotted bottom situated below said delivering members, and a driving device for the delivering members having adjusting means arranged to cause the adjusting of the stroke of one member to automatically effect corresponding adjustment of the other members.

5. In a distributing machine for artificial manure, a manure box having a slotted bottom, delivering members comprising a screenlike device situated below said bottom and movable alternately in opposite directions, and a second slotted bottom situated below said delivering members, the lower bottom of the same forming supports for the delivering members and being releasably connected to the manure box.

In witness whereof, I affix my signature.

ANDREAS KJÖLSTAD.